Feb. 16, 1954
E. W. PATTERSON
Re. 23,782
FRANGIBLE PISTON RING
Original Filed June 27, 1949
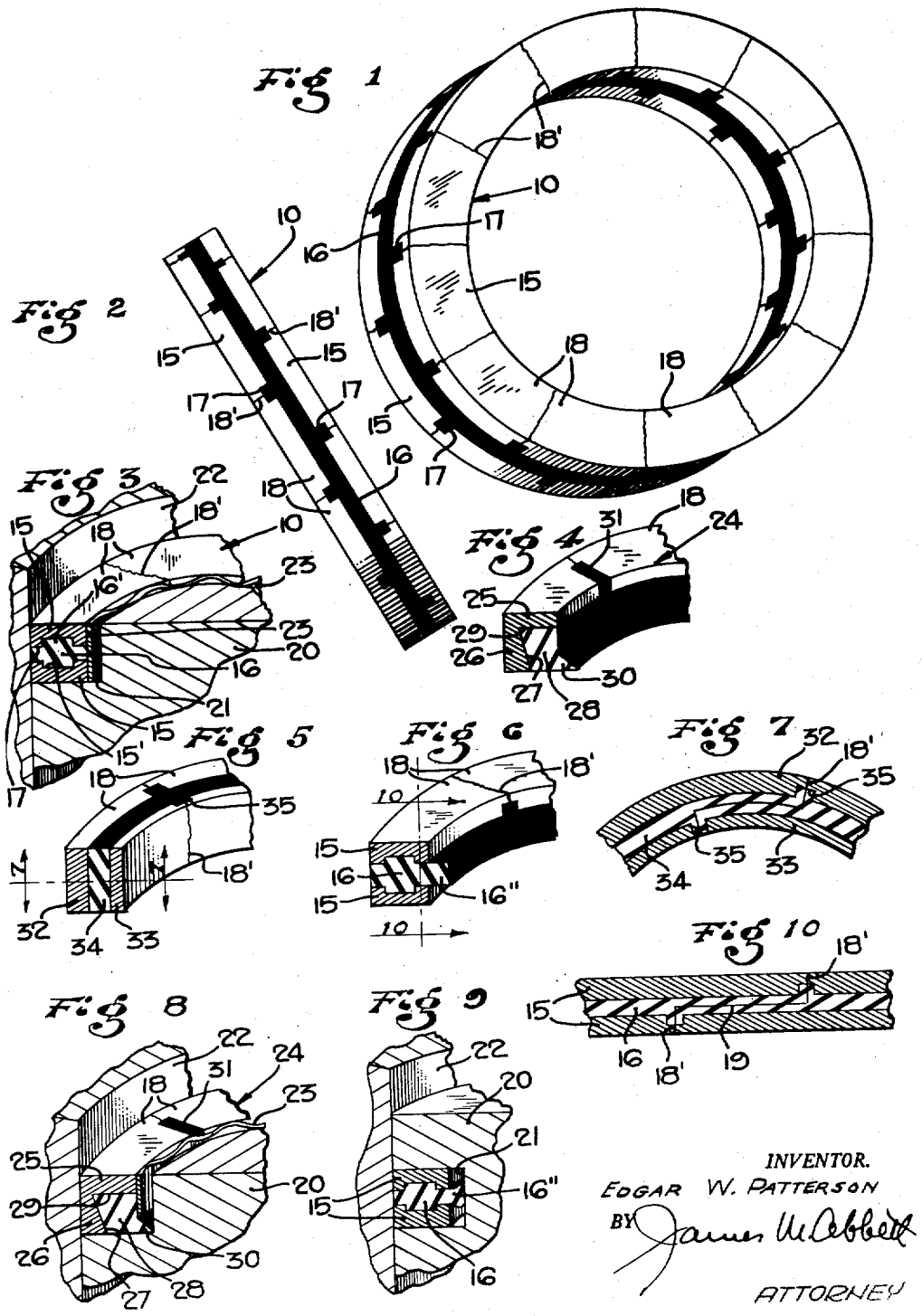
INVENTOR.
EDGAR W. PATTERSON
BY James McCabbett
ATTORNEY Reissued Feb. 16, 1954 Re. 23,782

UNITED STATES PATENT OFFICE 23,782

FRANGIBLE PISTON RING

Edgar W. Patterson, Downey, Calif.

Original No. 2,626,193, dated January 20, 1953, Serial No. 101,618, June 27, 1949. Application for reissue May 7, 1953, Serial No. 353,705

11 Claims. (Cl. 309—29)

Matter enclosed in heavy brackets [ ] appears in the original patent but forms no part of this reissue specification; matter printed in italics indicates the additions made by reissue.

This invention relates to piston rings, and particularly pertains to a frangible piston ring.

The primary object of this invention is to provide a flexible piston ring that will effectively seal a piston within a cylinder bore wherein the cylinder bore is in some cases slightly out of round. In actual practice it is known to be difficult to machine a true round and parallel cylinder bore, and under certain circumstances it is practically impossible to develop a perfectly round cylinder bore, especially in large diameters. In general practice where pistons and piston rings are fitted within cylinders for the purpose of operating therein with leak-proof relationship with regard to the piston and ring assembly reciprocating within the cylinder bore, it is the general practice to provide a wearing in, or breaking in, period whereby the piston rings may become adapted to the contour of the cylinder bore. Under certain circumstances this breaking in period is a very difficult operation to accomplish due to the time and expense involved. This is especially true with reference to very slow operating pistons of relatively large diameters. It is consequently a primary object of this invention to provide a piston ring that will readily adapt itself to the configuration of the cylinder bore, and require little, if any, breaking in operation.

My invention contemplates the provision of a laminated and flexible piston ring that may readily adapt itself to an out of round condition that will match the shape of a cylinder bore that is possibly thirty-thousandths of an inch egg-shaped in a bore diameter of approximately twelve inches.

This invention contemplates the use of a dead piston ring; a ring that has no expansive tension within itself. It must be expanded and held against the cylinder walls by means of either a spring or a composition expanding member, as shown in the drawings attached hereto.

In the drawings that form a part of this application I show several ways of making a piston ring of the type described herein, all or any one of which will act in approximately the same manner and bring about the same result. It is easily possible to develop other designs of similar laminated piston rings within the scope of the teachings set forth herein.

The process of manufacture, and the beneficial use of the laminated and flexible piston ring is as follows: A suitable metal piston ring member or members are rough finished to approximately the required size. Then the member or members are placed in a suitable mold and bonded to a flexible composition such as various types of synthetic rubber, etc., that is not seriously affected by oil or heat. After the bonding or vulcanizing is completed, the laminated ring is then finished as regards the diameter and thickness. Then the finished ring is fractured at the previously provided increments and the result is a ring consisting of a plurality of segmental metal parts securely held together by the flexible material bonded thereto. Then by the simple expedient of cutting a conventional step joint as shown in the drawings (Figs. 7 and 10), between any two of the cross sectional fractures, the ring then becomes easy to install in the groove of a conventional piston and thereafter it may readily adapt itself to an out of round condition under the influence of an expander spring, or flexible expander member that is molded as an integral part of the laminated ring.

A specific form of the invention is shown in the drawings wherein there is employed a pressure sealing lip which is molded as an integral part of the laminated ring. This pressure sealing lip is designed to bear against the side wall of the ring groove with the pressure exposed against the inner circumference of the ring and consequently against the beveled edge of the sealing lip whereby it functions as a self-energizing positive sealing means for keeping air, oil, or gas from bypassing around inside of the ring and out past the piston.

Other objects and advantages of the invention will be apparent from the following description when taken in connection with the accompanying drawings, in which:

Fig. 1 is an isometric view of one form of the invention.

Fig. 2 is an outer edge view in elevation of the same form as shown in Fig. 1.

Fig. 3 is a fragmentary view in isometric section showing the same ring as shown in both Figs. 1 and 2 as it would appear when in place in the ring groove of a piston, and within a cylinder. The piston is shown as being parted in a plane level with the top side of the ring.

Fig. 4 is a fragmentary view in isometric section showing a second type or design of the ring.

Fig. 5 is a fragmentary view in isometric section showing a third type or design of the ring.

Fig. 6 is a fragmentary view in isometric section showing a fourth type or design of the ring.

Fig. 7 is a fragmentary sectional circular view taken along line 7—7 of Fig. 5 and shows a step joint by which the piston ring of my invention may be and preferably is separated at one point in its circumference.

Fig. 8 is a fragmentary view in isometric section showing the ring in Fig. 4 as it would appear when in place in the ring groove of a piston, and within a cylinder. The piston is shown as being parted in a plane level with the top side of the ring.

Fig. 9 is a fragmentary view in isometric section of the ring shown in Fig. 6 as it would appear when installed in the groove of a piston and within a cylinder.

Fig. 10 is a fragmentary sectional view in edge elevation taken at line 10—10 of Fig. 6 and shows a step joint as formed in the piston ring of the type shown in Fig. 6.

Referring more particularly to Figs. 1 and 2 of the drawings, a piston ring 10 is indicated comprising complementary metallic sections 15. These sections are intended to be bonded together by an intermediate layer 16. This layer may be of a suitable flexible combination such as synthetic rubber and combines with the metallic ring sections 15 to form a single laminated ring structure. In order to facilitate the bonding action the opposing faces of the rings 15 are formed with radial grooves 17 which extend across the inner faces of the rings to receive the bonding material 16 and to facilitate in fracturing the ring sections 15 in a plurality of segments 18. It is desirable that the radial grooves 17 on the opposing faces of the metallic rings 15 shall be staggered with relation to each other, as indicated by the line 19 on Fig. 10 of the drawing. Fracturing of the ring sections 15 to form cracks 18' along the radial grooves 17 is followed by cutting the material of the bonding rubber ring 16 along the line 19 to form a step joint in the piston ring which entirely severs the ring along this line as opposite ends of this line terminate at cracks 18'. Thus it will be seen that the ring may be opened up between the segments 18 and installed upon a piston 20 in a conventional manner, and easily placed in piston grooves 21 so that it would accommodate the ring 10 and allow it to conform readily to a cylinder 22 within which the piston reciprocates. The accommodation of the piston ring 10 to the cylinder is facilitated by a sliding action of the end portions of the ring on opposite sides of the line 19 in the manner well known in the art, which results in an increase in the circumference of the ring while still maintaining a tight fit between the piston ring 10 and the wall of the cylinder 22 by virtue of the overlapping of the segments 18 adjacent the split joint 19 of the ring. For the purpose of forming a tight seal between the ring 10 and the cylinder 12 it is desirable to use a flat corrugated spring 23, known to the trade as a marcel spring. Attention is directed to the fact that in the form of the invention shown in Fig. 3 the bonding section 16 is formed with two flat portions 16' and grooves 15' which will act to hold the segments 18 against separation.

[Referring more particularly to Fig. 4 of the drawing, it will be seen that the ring is formed with a single metallic member 24. This member is formed with an upper flat portion 25 and a downwardly extending skirt 26 which has an outer cylindrical portion and an inclined bevel 27. The ring 24 is assembled with a flexible composition bonding ring 28 which fits into an annular recess 29 in the ring and has an outwardly extending lip portion 30 which is downwardly and outwardly beveled and aids in the sealing action. The upper section 25 of the ring 24 is radially slotted at 31 which facilitates in breaking the ring into sections 18 for a purpose to be hereinafter described.]

*Referring more particularly to Fig. 4 of the drawing, a modified form of piston ring 24 is here disclosed having a single metallic annulus 25. This annulus 25 has a flat upper portion and a downwardly extending skirt 26, the outer surface of which is cylindrical and the inner surface of which forms an inwardly inclined bevel 27. The metallic annulus 25 is assembled with a bonding and sealing ring member 28 which is formed of a flexible composition such as synthetic rubber and fits into an annular recess 29 formed inwardly in the metallic annulus 25. The sealing ring member 28 has an inwardly extending lip portion 30 which is downwardly and inwardly beveled thereby aiding in the sealing action of said piston ring. The upper flat portion of the metallic annulus 25 of the piston ring 24 is radially slotted at 31 which facilitates the breaking of said metallic annulus into segments 18.*

*The sealing lip 30 is formed on the flexible sealing ring member 28 so that the bottom face of said member and said lip, right up to the thin edge of the latter, rest flat against the low pressure side wall of groove 21. Sealing lip 30 is also beveled, so that the upper face thereof forms an acute angle with the bottom face thereof. These structural features cause said lip to be pressed against said low pressure side wall of groove 21 by fluid from the high pressure side of said piston ring gaining access to the annular space in said groove behind said piston ring 24. Said lip thus seals off said annular space and prevents fluid from the upper or high pressure side of said piston ring 24 escaping to the bottom or low pressure side thereof by passing between said piston ring and said piston. In other words, the shape and positioning of sealing lip 30 prevents fluid escaping around piston ring 24 through groove 21, and thus by-passing said piston ring. No fluid is able to escape past piston ring 24, therefore, unless it is able to pass downwardly between the cylinder 22 and said ring.*

Referring more particularly to Fig. 5 of the drawing a laminated ring is shown comprising a cylindrical outer ring 32 and an inner cylindrical ring 33. These two rings are metallic and are concentrically arranged one within the other. Disposed between these rings is a space to accommodate a flexible composition bonding member 34. The rings 32 and 33 are each formed with longitudinally extending grooves 35 which permit the composite ring structure to be fractured into sections 18.

Fig. 6 shows a fragmentary portion of the ring illustrated in Fig. 9 and indicates the manner in which it is constructed.

Referring to Fig. 8, the piston 20 and the cylinder 22 are shown as fitted with a form of ring 24 particularly illustrated in Fig. 4 of the drawing.

Referring more particularly to Fig. 9, it will be seen that the ring structure shown in Fig. 6 is illustrated and the manner in which its inner bonding is used as a sealing means is designated. Here it will be seen that one of the members 16' extends against the inner wall of the piston groove 21 and forms a seal therewith, and also expands the ring outward against the cylinder wall.

In operation of the present invention, any one of the forms of the piston ring is made as illustrated in the drawings. In the forms shown in Figs. 1–3, 5–7, inclusive, 9 and 10, two separate relatively thin metallic rings are provided which are bonded by an intermediate layer of flexible compound. This fills the radial grooves in the faces of the metallic rings, after which the metallic rings are broken along the fractured lines 18' so that the metallic rings will be in the segments 18. Attention is also directed to the fact that when the ring segments are bonded as shown in either Fig. 7 or Fig. 10 the grooves will be staggered so that the intermediate layer of bonding material 16 will provide a flexible connection between the metallic segments. This will allow the composite ring 10 to readily conform to the surface of the cylinder 22 whether or not the cylinder is out of round, and will insure that a desirable fluid seal will occur between the piston and the cylinder at all times. Attention is also directed to the fact that the ring here shown will have exceeding flexibility so that the possibility of excessive wearing or scoring of the cylinder is limited, and furthermore, that the ring will not have any inherent expansive tension but this will be imparted to it by the flexible bonding material and the corrugated springs 23.

It will thus be seen that the piston ring structure here disclosed may be easily manufactured and can be readily mounted upon a piston, and that furthermore it will insure a suitable seal between the piston and the cylinder with a minimum amount of wear or scoring.

While I have shown the preferred method and the preferred combination of elements for carrying out said method, it is to be understood that various changes in the steps of the method and the combination, construction and arrangement of parts may be made by those skilled in the art, without departing from the spirit of the invention as claimed.

Having thus described my invention, what I claim and desire to secured by Letters Patent is:

1. A laminated piston ring comprising a pair of metallic annuli, and an intermediate bonding layer formed of flexible material and designed to hold said annuli together, the opposing faces of said annuli being formed with radially extending grooves which receive the bonding material, and the annuli being separated into circumferential segments, said lines of separation extending longitudinally of the radial grooves.

2. A laminated piston ring comprising a pair of relatively flat annuli formed with radial grooves at intervals throughout the circumference thereof and upon their opposing faces, said grooves being staggered with relation to each other, and a layer of flexible bonding material to fill the space between the annuli and to fill the radial grooves, said annuli being broken into segments along the line of the radial grooves.

3. A laminated piston ring comprising metallic frangible sections adapted to fit into a cylinder and a piston ring groove, and an intermediate layer of flexible material bonding said sections, the opposing faces of said sections being formed with grooves to receive the bonding material, the sections being broken along the lines of said grooves.

4. A piston ring comprising a pair of annuli designed to lie parallel to each other and carrying a lamination of material between them to bond the annuli together, said bonding lamination being of lesser inside diameter than the inside diameter of the annuli whereby said bonding lamination will provide a sealing lip, radial grooves being formed in the opposing faces of the annuli to receive the bonding material, there being fractures occurring across said annuli at the grooves to separate the annuli in a plurality of circumferential segments.

5. A piston ring comprising a frangible metallic annulus, a sealing ring carried thereby of nonmetallic material, there being radial grooves formed in the annulus and receiving portions of the sealing ring, said annulus being fractured throughout its circumference at said radial grooves whereby a plurality of circumferential segments will be formed.

6. A piston ring adapted to fit into an external annular groove in the metallic piston to form a seal between said piston and the wall of a cylinder chamber in which said piston reciprocates, said ring comprising a frangible metallic annulus the periphery of which is dimensioned to substantially fit said chamber wall, and a soft rubber ring bonded to said annulus, said annulus being weakened at uniform intervals to facilitate its being broken into a circumferential series of segments, the latter being held together by their bond with said rubber ring.

7. A piston ring adapted to fit into an external annular groove in a metallic piston to form a seal between said piston and the wall of a cylinder chamber in which said piston reciprocates, said ring comprising a frangible metallic annulus the periphery of which is dimensioned to substantially fit said chamber wall, and a soft rubber ring bonded to said annulus, said annulus being radially grooved at regular intervals to weaken said annulus and permit it to be broken along the lines of said grooves to divide said annulus into a circumferential series of segments held together in assembled relation by the bond between said segments and said rubber ring.

8. A piston ring adapted to fit into an external annular groove in a metallic piston to form a seal between said piston and the wall of a cylinder chamber in which said piston reciprocates, said ring comprising a pair of concentric frangible metallic annuli the peripheries of which are dimensioned to substantially fit said chamber wall, and a soft rubber ring bonded to said annuli, said annuli being weakened at uniform intervals to facilitate each of these being broken into a circumferential series of segments, the segments of said two annuli being held flexibly together by said rubber ring.

9. A piston ring adapted to fit into an external annular groove in a metallic piston to form a seal between said piston and the wall of a cylinder chamber in which said piston reciprocates, said ring comprising a pair of concentric frangible metallic annuli the peripheries of which are dimensioned to substantially fit said chamber wall, and a soft rubber ring disposed between and bonded to said annuli, opposed faces of said annuli being provided at regular intervals with radial grooves into which the rubber of said rubber ring extends and which have the function of weakening said annuli on the lines of said grooves so that when undue pressure is applied, each of said annuli will break along the lines of said grooves to form a circumferential series of segments, the bond between said rubber ring and said segments retaining the latter assembled in annular form and continuing to unite said annuli.

10. A combination as in claim 9 in which said grooves are in staggered relation so that when said annuli are broken into segments, said segments of each annulus are in overlapping relation with the segments of the other annulus.

*11. A piston ring adapted to fit into an external annular groove with radial side walls in a metallic piston to form a seal between said pis-*

*ton and a cylinder in which said piston reciprocates, said piston ring comprising: a metallic annulus, the outer periphery of which is adapted to substantially fit said cylinder when said ring is disposed in said groove between said radial side walls; and a flexible rubber sealing ring member disposed within and snugly fitting the inner periphery of said annulus, said member having a beveled annular sealing lip extending radially inwardly from said member to a thin inner edge formed on said lip, said lip being united with said member so as to be constantly held flat against the radial side wall of said ring groove on the low pressure side of said piston ring, right up to said thin edge of said lip, the space in said groove behind said piston ring being accessible to entry by fluid from the high pressure side of said piston ring whereby said fluid enters said space and presses said member against said annulus, and said lip against said groove side wall, thereby forming a seal preventing the passage of fluid around said piston ring through said groove from the high pressure side of said piston ring to the low pressure side thereof.*

EDGAR W. PATTERSON.

References Cited in the file of this patent or the original patent

UNITED STATES PATENTS

| Number | Name | Date |
|---|---|---|
| 1,385,508 | Trembley | July 26, 1921 |
| 1,676,432 | Dieterich | July 10, 1928 |
| 1,736,252 | Clark | Nov. 19, 1929 |
| 1,854,708 | Mastin | Apr. 19, 1932 |
| 1,898,292 | Crickmer | Feb. 21, 1933 |
| 2,067,499 | Millmine | Jan. 12, 1937 |
| 2,181,748 | Thaheld | Nov. 28, 1939 |
| 2,298,584 | Onions | Oct. 13, 1942 |
| 2,305,276 | Rushmore | Dec. 15, 1942 |
| 2,334,243 | Bowers | Nov. 16, 1943 |
| 2,397,308 | Barnes | Mar. 26, 1946 |
| 2,443,065 | Bowers | June 8, 1948 |
| 2,466,428 | Hufferd | Apr. 5, 1949 |
| 2,549,818 | Joy | Apr. 23, 1951 |
| 2,557,835 | Monahan | June 19, 1951 |

FOREIGN PATENTS

| Number | Country | Date |
|---|---|---|
| 481,762 | Great Britain | Mar. 17, 1938 |
| 522,024 | Great Britain | June 6, 1940 |